United States Patent
Swezey et al.

(10) Patent No.: US 11,487,835 B2
(45) Date of Patent: Nov. 1, 2022

(54) INFORMATION PROCESSING SYSTEM, INFORMATION PROCESSING METHOD, AND PROGRAM

(71) Applicant: RAKUTEN GROUP, INC., Tokyo (JP)

(72) Inventors: Robin Swezey, Tokyo (JP); Jing Mi, Tokyo (JP); Vijay Daultani, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 20 days.

(21) Appl. No.: 17/251,191

(22) PCT Filed: Aug. 6, 2018

(86) PCT No.: PCT/JP2018/029415
§ 371 (c)(1),
(2) Date: Dec. 10, 2020

(87) PCT Pub. No.: WO2020/031232
PCT Pub. Date: Feb. 13, 2020

(65) Prior Publication Data
US 2021/0248201 A1 Aug. 12, 2021

(51) Int. Cl.
*G06F 16/9535* (2019.01)
*G06F 16/9035* (2019.01)
(Continued)

(52) U.S. Cl.
CPC ...... *G06F 16/9535* (2019.01); *G06F 16/9035* (2019.01); *G06F 16/9536* (2019.01); *G06Q 10/02* (2013.01)

(58) Field of Classification Search
CPC ............. G06F 16/9535; G06F 16/9035; G06F 16/9536
See application file for complete search history.

(56) References Cited

U.S. PATENT DOCUMENTS 6,029,195 A * 2/2000 Herz .................. G06Q 30/02
725/116
10,776,445 B2 * 9/2020 Matsuda ............. G06F 16/9566
(Continued)

FOREIGN PATENT DOCUMENTS

JP 2012190061 A 10/2012

OTHER PUBLICATIONS

Odagiri, Yuri. "Machine Learning in Contents Platform: Industrial Advancements Using Data Set Publication and Model Publication. The Journal of the Institute of Electronics, Information and Communication Engineers." Jan. 1, 2017, vol. 100, No. 1, pp. 25-31 (Cited in the International Search Report for PCT/JP2018/029415—translation provided).
(Continued)

*Primary Examiner* — Grace Park
(74) *Attorney, Agent, or Firm* — HEA Law PLLC

(57) ABSTRACT

Identification means of an information processing system identifies, based on an action history of each of a plurality of users, a plurality of data items having a degree of action equal to or more than a predetermined degree. First information acquisition means acquires, based on the action history of each user, first information indicating relevance between the respective data items identified by the identification means. Output means outputs, when details of each of the plurality of data items are input, second information indicating relevance between the respective data items based on a predetermined parameter. Setting means sets the parameter based on the details of each data item identified by the identification means and the first information.

8 Claims, 14 Drawing Sheets

(51) Int. Cl.
*G06F 16/9536* (2019.01)
*G06Q 10/02* (2012.01)

(56) References Cited

U.S. PATENT DOCUMENTS

| | | | | |
|---|---|---|---|---|
| 2007/0060099 | A1* | 3/2007 | Ramer | G06F 16/9535 |
| | | | | 455/405 |
| 2007/0061301 | A1* | 3/2007 | Ramer | G06Q 30/04 |
| 2007/0073723 | A1* | 3/2007 | Ramer | G06Q 30/0247 |
| 2011/0106614 | A1* | 5/2011 | Ramer | G06Q 30/0247 |
| | | | | 705/14.46 |
| 2012/0233183 | A1 | 9/2012 | Nakahashi et al. | |
| 2016/0098404 | A1* | 4/2016 | Rubenczyk | G06F 16/9535 |
| | | | | 707/728 |
| 2017/0161618 | A1 | 6/2017 | Swaminathan et al. | |
| 2018/0288177 | A1* | 10/2018 | Deo | G06Q 30/0204 |

OTHER PUBLICATIONS

Taguchi, Hiroshi et al. "Personalized Document Recommendation for Field Engineers." [online], Jul. 27, 2011 [retrieved: Aug. 4, 2011], Internet:<URL:http://db-event.jpn.org/deim2011/proceedings/pdf/b1-4.pdf> (Cited in the International Search Report for PCT/JP2018/029415—translation provided).

International Search Report for PCT/JP2018/029415 with English translation.

\* cited by examiner

FIG.9

| USER ID | ACCOMMODATION FACILITY ID | ACTION DETAILS | ACTION DATE AND TIME |
|---|---|---|---|
| u00001 | h00001 | VIEW | 2018/5/29 10:02:15 |
| u00001 | h00002 | VIEW | 2018/5/29 10:02:32 |
| u00002 | h00015 | RESERVE | 2018/5/27 19:15:41 |
| u00003 | h00008 | VIEW | 2018/5/30 12:51:13 |
| u00003 | h00012 | RESERVE | 2018/5/31 08:14:15 |
| u00003 | h00016 | VIEW | 2018/5/31 08:16:21 |
| ... | ... | ... | ... |

| ACCOMMODATION FACILITY ID | h00001 | h00002 | h00003 | ... |
|---|---|---|---|---|
| h00001 | – | 0.85 | 0.74 | ... |
| h00002 | 0.85 | – | 0.79 | ... |
| h00003 | 0.74 | 0.79 | – | ... |
| ... | ... | ... | ... | ... |

| COUPON ID | ACCOMMODATION FACILITY ID | DETAILS |
|---|---|---|
| q00001 | h00001 | 2,000 YEN OFF |
| q00002 | h00002 | 15% OFF |
| q00003 | h00003 | ONE GUEST FREE OF CHARGE |
| . . . | . . . | . . . |

INFORMATION PROCESSING SYSTEM, INFORMATION PROCESSING METHOD, AND PROGRAM

CROSS REFERENCE TO RELATED APPLICATIONS

This application is a National Stage of International Application No. PCT/JP2018/029415 filed on Aug. 6, 2018. The contents of the above document is incorporated herein by reference in its entirety.

TECHNICAL FIELD

The one embodiment of the present invention relates to an information processing system, an information processing method, and a program.

BACKGROUND ART

Hitherto, there have been known technologies for identifying relevance between a plurality of data items. For example, in Patent Literature 1, there is described a technology called content-based filtering for identifying, based on details of a piece of content (example of data item), another piece of content related to the content viewed by a user. In Patent Literature 1, there is also described, for example, a technology called collaborative filtering for identifying, based on an action history of each of a plurality of users, a combination of users having a similar preference or a combination of pieces of content having high relevance to each other.

CITATION LIST

Patent Literature

[PTL 1] JP 2012-190061 A

SUMMARY OF INVENTION

Technical Problem

In content-based filtering, for example, an algorithm using the details of each of a plurality of pieces of content as input and information indicating relevance between the respective details as an output is used. However, in the related-art content-based filtering, the parameter setting of the algorithm is performed based on human intuition, and hence it is difficult to accurately identify content having high relevance.

Moreover, with collaborative filtering, the actual action history of the user is used, and hence for content that is frequently, for example, viewed, it is possible to analyze a user preference that may not be determined quantitatively from the details of the content, and to accurately identify content having high relevance. However, for content that is not frequently, for example, viewed, the amount of information is small, which prevents accurate identification of content having high relevance.

The one embodiment of the present invention has been made in view of the above-mentioned issues. It is an object of the present invention to provide an information processing system, an information processing method, and a program, which can increase the accuracy of identifying data items having high relevance.

Solution to Problem

In order to solve the above-mentioned issues, an information processing system according to at least one embodiment of the present invention includes: identification means for identifying, based on an action history of each of a plurality of users, a plurality of data items having a degree of action equal to or more than a predetermined degree; first information acquisition means for acquiring, based on the action history of each user, first information indicating relevance between the respective data items identified by the identification means; output means for outputting, when details of each of the plurality of data items are input, second information indicating relevance between the respective data items based on a predetermined parameter; and setting means for setting the parameter based on the details of each data item identified by the identification means and the first information.

An information processing method according to at least one embodiment of the present invention includes: an identification step of identifying, based on an action history of each of a plurality of users, a plurality of data items having a degree of action equal to or more than a predetermined degree; a first information acquisition step of acquiring, based on the action history of each user, first information indicating relevance between the respective data items identified in the identification step; an output step of outputting, when details of each of the plurality of data items are input, second information indicating relevance between the respective data items based on a predetermined parameter; and a setting step of setting the parameter based on the details of each data item identified in the identification step and the first information.

A program according to at least one embodiment of the present invention causes a computer to function as: identification means for identifying, based on an action history of each of a plurality of users, a plurality of data items having a degree of action equal to or more than a predetermined degree; first information acquisition means for acquiring, based on the action history of each user, first information indicating relevance between the respective data items identified by the identification means; output means for outputting, when details of each of the plurality of data items are input, second information indicating relevance between the respective data items based on a predetermined parameter; and setting means for setting the parameter based on the details of each data item identified by the identification means and the first information.

According to at least one aspect of the present invention, the information processing system according to claim 1, further includes: second information acquisition means for inputting the details of each of the plurality of data items to the output means and acquiring the second information; and providing means for providing, based on the second information on each data item for which the second information has been acquired, information on another data item related to each data item.

According at least to one aspect of the present invention, the providing means is configured to: provide, for a data item for which the degree of action is equal to or more than the predetermined degree, the information based on the first information; and provide, for a data item for which the degree of action is less than the predetermined degree, the information based on the second information.

According to at least one aspect of the present invention, the providing means is configured to provide, based on the second information on a data item on which an action has been performed by each user, each user with the information on another data item related to the data item.

According to at least one aspect of the present invention, the information processing system further includes determination means for determining, based on the action history of each user, a user to which the information is to be provided, and the providing means is configured to provide the information to the user determined by the determination means.

According to at least one aspect of the present invention, the information processing system further includes grouping means for grouping respective users based on a method determined in advance, the parameter is provided for each user group, and the setting means is configured to set the parameter for each user group.

According to at least one aspect of the present invention, the information processing system further includes update means for updating the action history of each user, and the setting means is configured to update the parameter based on the action history of each user updated by the update means.

Advantageous Effects of Invention

According to the present invention, the accuracy of identifying data items having high relevance can be increased.

BRIEF DESCRIPTION OF DRAWINGS

FIG. 9 is a table for showing a data storage example of an action history database.

FIG. 10 is a table for showing a data storage example of a score database.

FIG. 11 is a table for showing a data storage example of a coupon database.

DESCRIPTION OF EMBODIMENTS

1. Overall Configuration of Information Processing System

Figure 1:
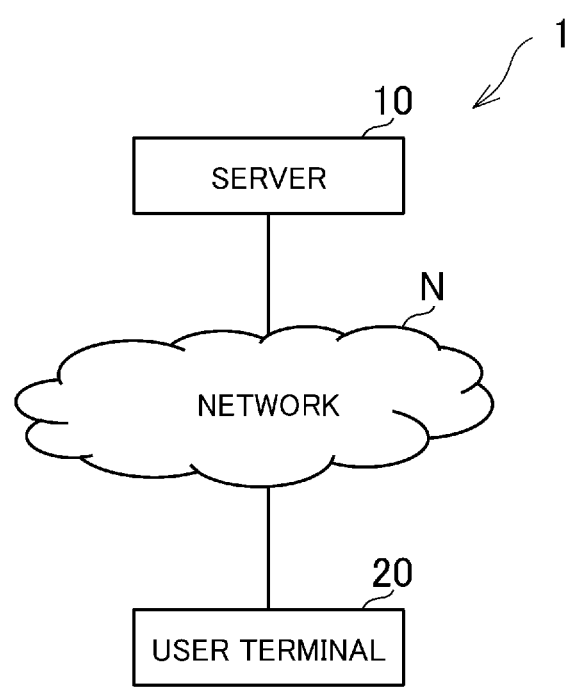
FIG. 1 is a diagram for illustrating an overall configuration of an information processing system according to at least one embodiment of the present invention.

Now, there is described an example of an information processing system according to at least one embodiment of the present invention. FIG. 1 is a diagram for illustrating an overall configuration of an information processing system.

As illustrated in FIG. 1, an information processing system 1 includes a server 10 and a user terminal 20, which are connected via a network N so that data can be transmitted and received. In FIG. 1, one server 10 and one user terminal 20 are illustrated, but a plurality of servers 10 and a plurality of user terminals 20 may be arranged.

Figure 2:
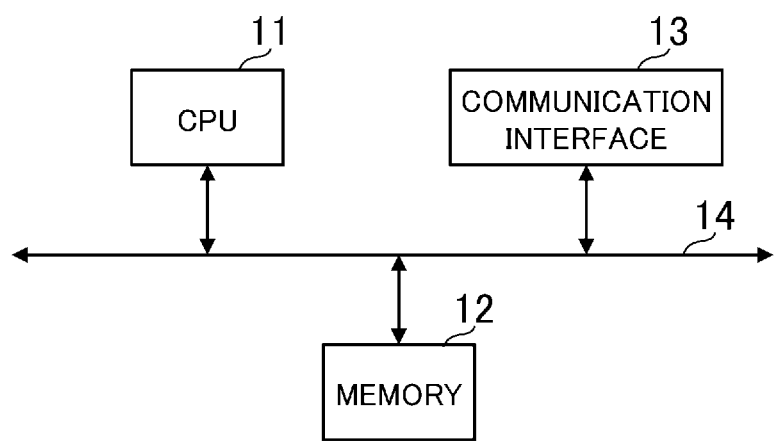
FIG. 2 is a diagram for illustrating a physical configuration of a server.

FIG. 2 is a diagram for illustrating a physical configuration of the server 10. As illustrated in FIG. 2, the server 10 is a server computer, and includes, for example, a CPU 11, a memory 12, and a communication interface 13, which are connected by a bus 14. The CPU 11 is configured to execute processing in accordance with programs and data stored in the memory 12. In FIG. 2, one CPU 11 is arranged, but the server 10 may have any configuration as long as the server 10 includes at least one processor, and may include two or more CPUs 11. The memory 12 includes a main storage unit and an auxiliary storage unit. For example, the main storage unit is a volatile memory such as a RAM, and the auxiliary storage unit is a non-volatile memory such as a hard disk drive or a flash memory. The communication interface 13 is a communication interface for wired communication or wireless communication, and is configured to perform data communication via a network, for example.

The user terminal 20 is a computer to be operated by a user, and examples thereof include a personal computer, a portable information terminal (including a tablet computer), and a cell phone (including a smartphone).

The programs and data described as being stored in the memory 12 may be supplied to the server 10 via a network. The hardware configuration of the server 10 is not limited to the above-mentioned example, and various types of hardware can be applied. For example, the server 10 may include a reader (e.g., optical disc drive or memory card slot) configured to read a computer-readable information storage medium, and an input/output interface (e.g., USB terminal) for directly connecting to an external device. The programs and data stored in the information storage medium may be supplied to the server 10 via the reader or the input/output interface.

2. Outline of Information Processing System

The information processing system 1 is configured to retrieve data items based on a search condition input by the user and to display on the user terminal 20 a data item selected by the user from among the search results.

The search condition is a query to be used at the time of the search. Examples of the applicable search condition include a keyword, a numerical value, a category, a genre, an attribute, and other various conditions.

A data item is the unit of data to be searched, and is, for example, an individual record in a database. The data item may be any type of data, and may be, for example, content such as a web page (website), an electronic book, a moving image, a piece of music, or an application, or may be a file such as a document file, a text file, an image file, or an audio file.

Each data item is associated with an index. Data items associated with an index matching the search condition are retrieved. The search itself can be performed based on various methods, and data items having an index that completely or partially matches the search condition may be retrieved, or a fuzzy search may be used.

In this embodiment, there is described a case in which the information processing system 1 is applied to a travel reservation service, and a page of an accommodation facility is described as an example of a data item. As the accommodation facility, various facilities such as a hotel, an inn, and a guest house are applicable. On the accommodation facility page, any information may be displayed, for example, information such as the name, location, number of rooms, type, category, introductory description, transportation access, contact details, amenities, and usage cost of the accommodation facility may be displayed.

For example, when the user operates the user terminal 20 and accesses the server 10, the top page of the travel reservation service is displayed on the user terminal 20. The user inputs the search condition in the top page, and searches for a desired accommodation facility. The page (screen) to be described below may be displayed in an application stored in the user terminal 20 or may be displayed by a web browser.

Figure 3:
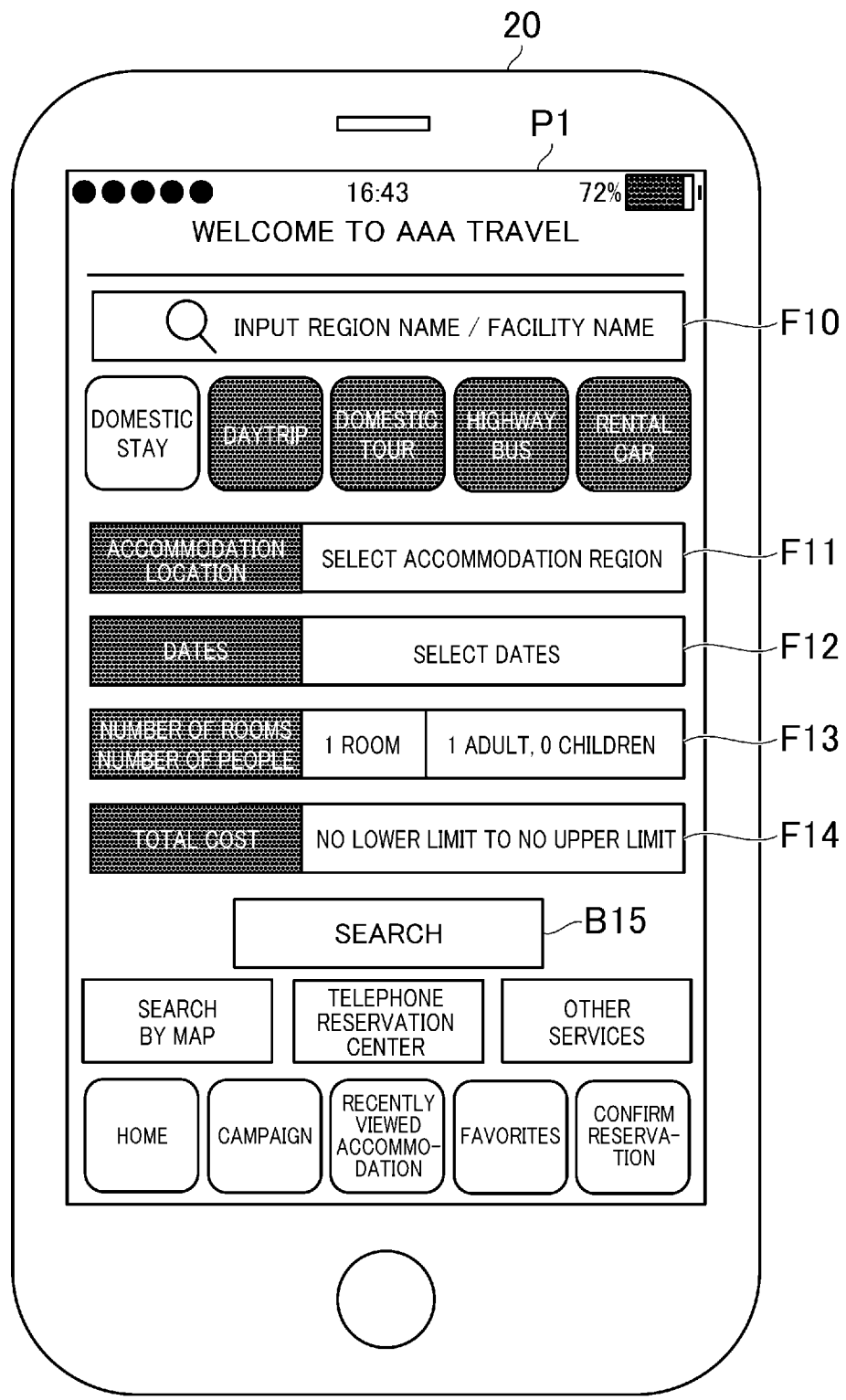
FIG. 3 is a diagram for illustrating an example of a top page.

FIG. 3 is a diagram for illustrating an example of the top page. As illustrated in FIG. 3, on the top page P1, for example, input forms F10 to F14 for inputting the search condition and a button B15 for executing the search are displayed. As illustrated in FIG. 3, the user inputs search conditions including the facility name, location, dates, number of persons, and cost in the input forms F10 to F14. When the user inputs the search conditions and selects the button B15, the server 10 retrieves accommodation facilities based on the search conditions, and transmits the search results to the user terminal 20. When the search results are received, the user terminal 20 displays a search result page for presenting the search results.

Figure 4:
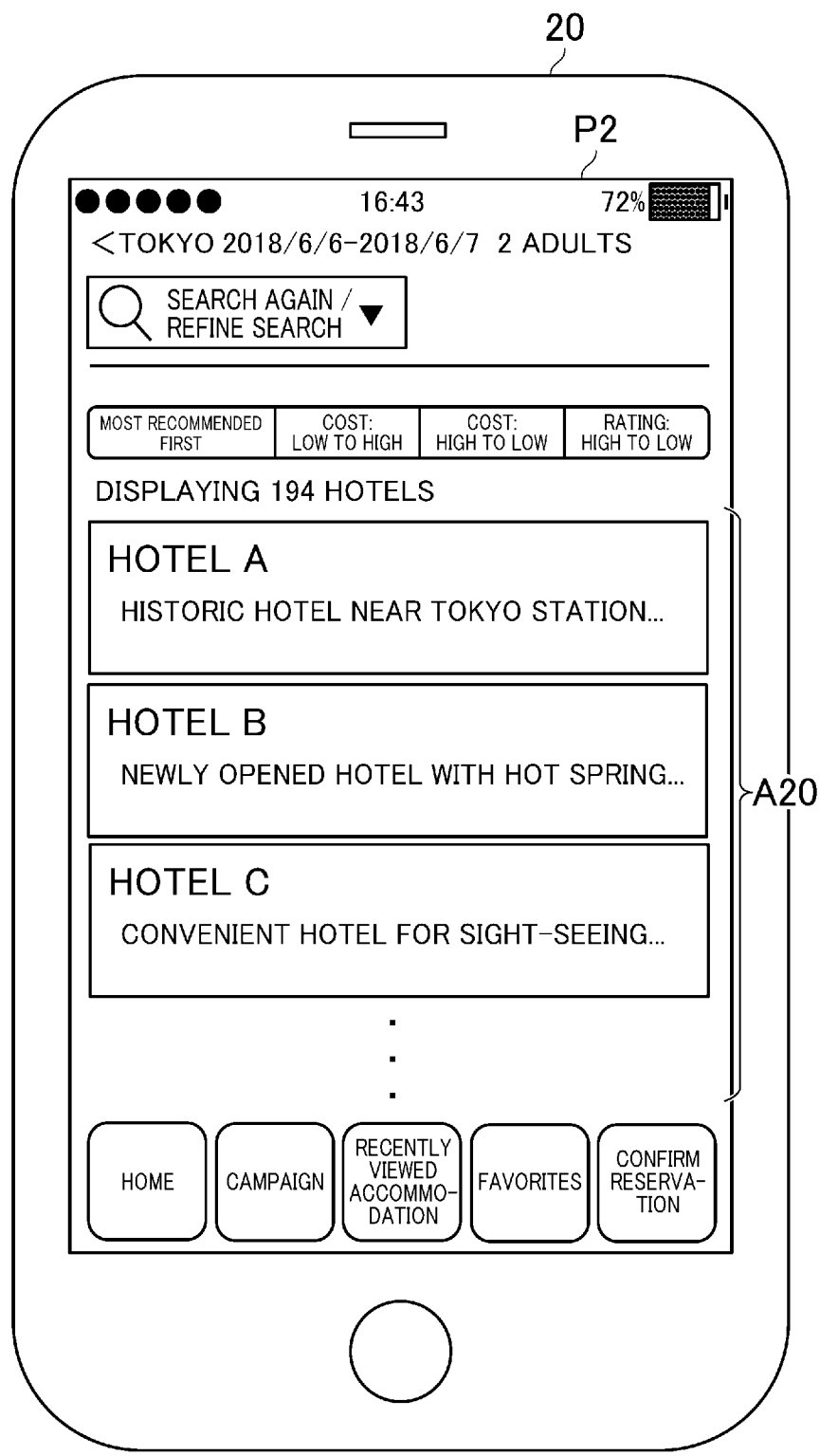
FIG. 4 is a diagram for illustrating an example of a search result page.

FIG. 4 is a diagram for illustrating an example of the search result page. As illustrated in FIG. 4, in a display area A20 of a search result page P2, a list of the accommodation facilities retrieved in the search is displayed, and information such as the name, rating, and price range of each accommodation facility is displayed. When the user selects any of the accommodation facilities displayed in the display area A20, an accommodation facility page for presenting the details of the selected accommodation facility is displayed on the user terminal 20.

Figure 5:
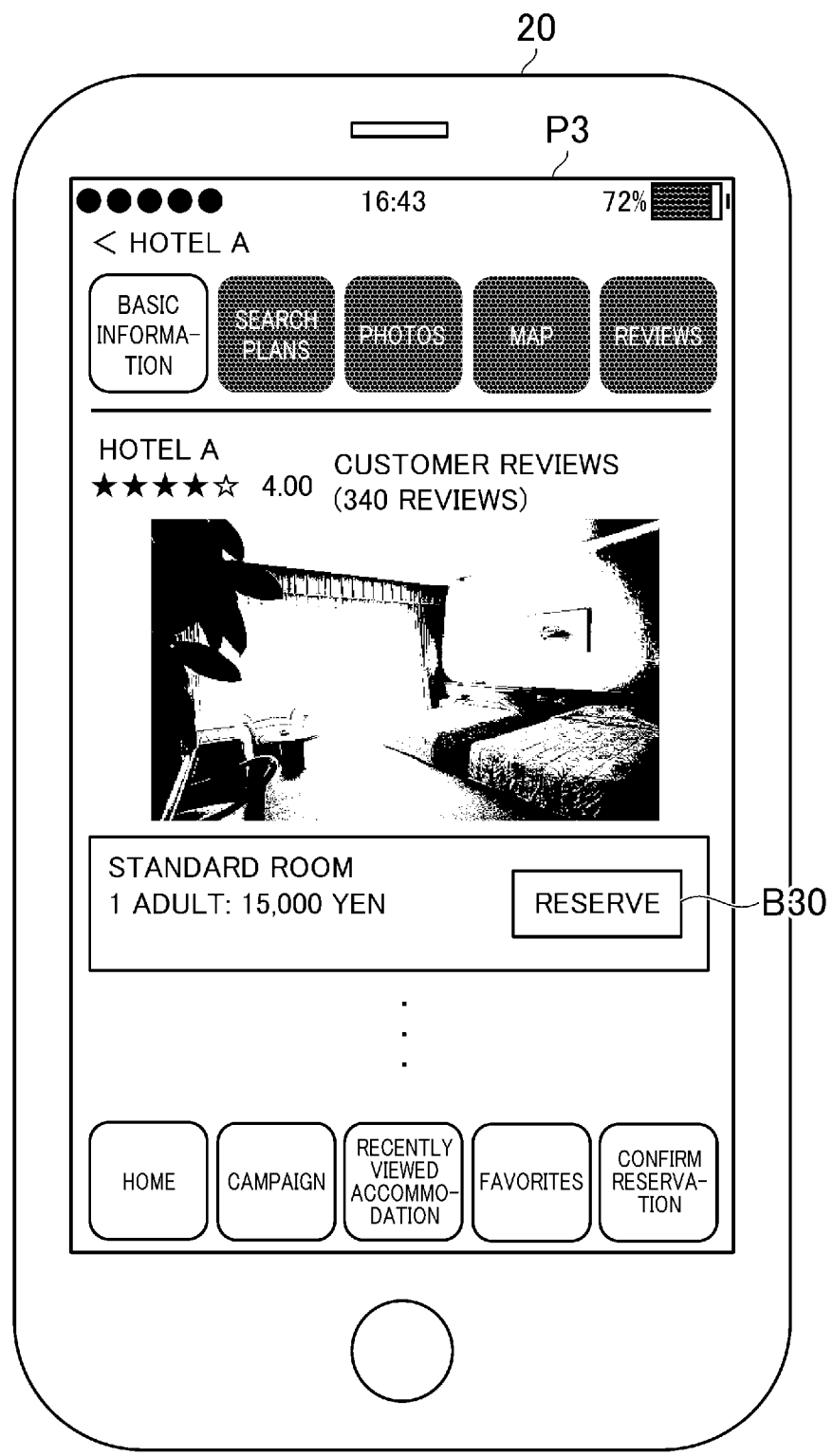
FIG. 5 is a diagram for illustrating an example of an accommodation facility page.

FIG. 5 is a diagram for illustrating an example of the accommodation facility page. As illustrated in FIG. 5, on an accommodation facility page P3, detailed information on the accommodation facility is displayed. For example, information such as the name, rating, image, name of the room, and cost of the accommodation facility are displayed. A button B30 for reserving the accommodation facility is also displayed on the accommodation facility page P3. The user can reserve the accommodation facility displayed on the accommodation facility page P3 by selecting the button B30.

The information processing system 1 in this embodiment is configured so that a coupon of another accommodation facility related to the accommodation facility viewed or reserved by the user displayed on the user terminal 20. In this embodiment, there is described a case in which the coupon is displayed on the search result page P2, but the coupon may be displayed on any page, for example, the top page P1, the accommodation facility page P3, or another page. As another example, the coupon may be provided by using email, an application, a social networking service, or the like.

Figure 6:
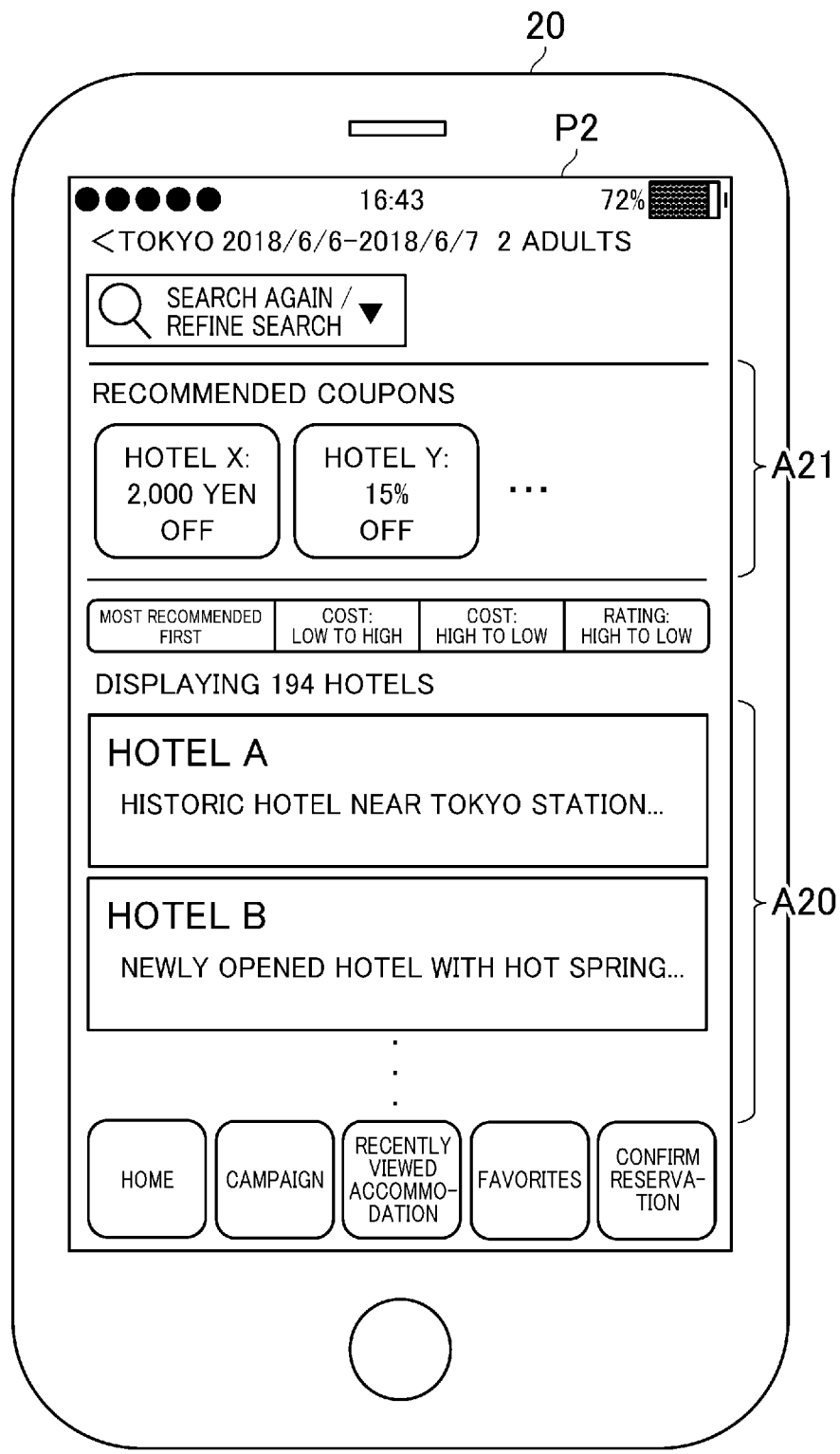
FIG. 6 is a diagram for illustrating how a coupon is displayed on the search result page.

FIG. 6 is a diagram for illustrating how the coupon is displayed on the search result page P2. As illustrated in FIG. 6, in the display area A21 of the search result page P2, coupons of other accommodation facilities related to the accommodation facility viewed or reserved by the user are displayed. In the example of FIG. 6, the coupon of "Hotel X" presented in the display area A21 is a coupon of a hotel related to "Hotel A" viewed by the user, and the coupon of "Hotel Y" presented in the display area A21 is a coupon of a hotel related to "Hotel B" viewed by the user.

As described in the related art, content-based filtering and collaborative filtering are available as technologies for identifying related accommodation facilities. In content-based filtering, accommodation facilities having similar details to the accommodation facility page P3 are identified, and hence accommodation facilities having, for example, a similar location, number of rooms, type, category, transportation access, or the like are identified. Meanwhile, in collaborative filtering, accommodation facilities are identified based on the action history of each user, and hence, for example, the related accommodation facilities are identified in consideration of user preferences that are not quantitatively measurable based only on the details.

As described in the related art, in content-based filtering, it is difficult to set the parameter of an algorithm for calculating a score indicating relevance between accommodation facilities, and hence the accuracy of the score cannot be increased sufficiently. In collaborative filtering, for accommodation facilities that are not frequently viewed or reserved, the accuracy of the score cannot be increased sufficiently because the amount of information is small.

Therefore, the information processing system 1 in this embodiment is configured to calculate a score based on collaborative filtering of a frequently viewed or reserved accommodation facility, and set the parameter for content-based filtering based on the details of the accommodation facility page P3 and the calculated score. As a result, even for accommodation facilities that are not frequently viewed or reserved, the information processing system 1 acquires a score with almost the same degree of accuracy as collaborative filtering of the frequently viewed or reserved accommodation facility, and increases the accuracy of identifying an accommodation facility having high relevance. The information processing system 1 is now described in detail.

3. Functions to be Implemented by Information Processing System

Figure 7:
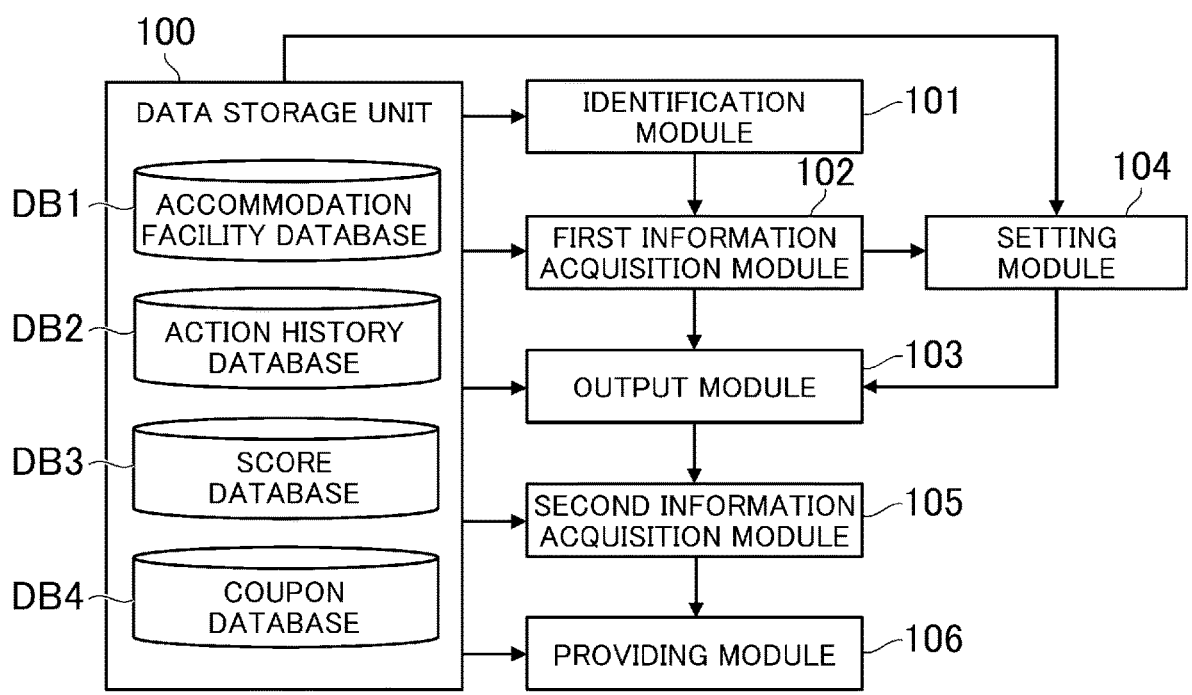
FIG. 7 is a functional block diagram for illustrating an example of functions to be implemented in the information processing system.

FIG. 7 is a functional block diagram for illustrating an example of functions to be implemented in the information processing system 1. As illustrated in FIG. 7, in the information processing system 1, a data storage unit 100, an identification module 101, a first information acquisition module 102, an output module 103, a setting module 104, a second information acquisition module 105, and a providing module 106 are implemented. In this embodiment, there is described a case in which each of these functions is implemented by the server 10.

[3-1. Data Storage Unit]

The data storage unit 100 is mainly implemented by the memory 12. The data storage unit 100 is configured to store data required in order to identify related accommodation facilities. As an example of the data stored in the data storage unit 100, there are described an accommodation facility database DB1, an action history database DB2, a score database DB3, and a coupon database DB4.

Figure 8:
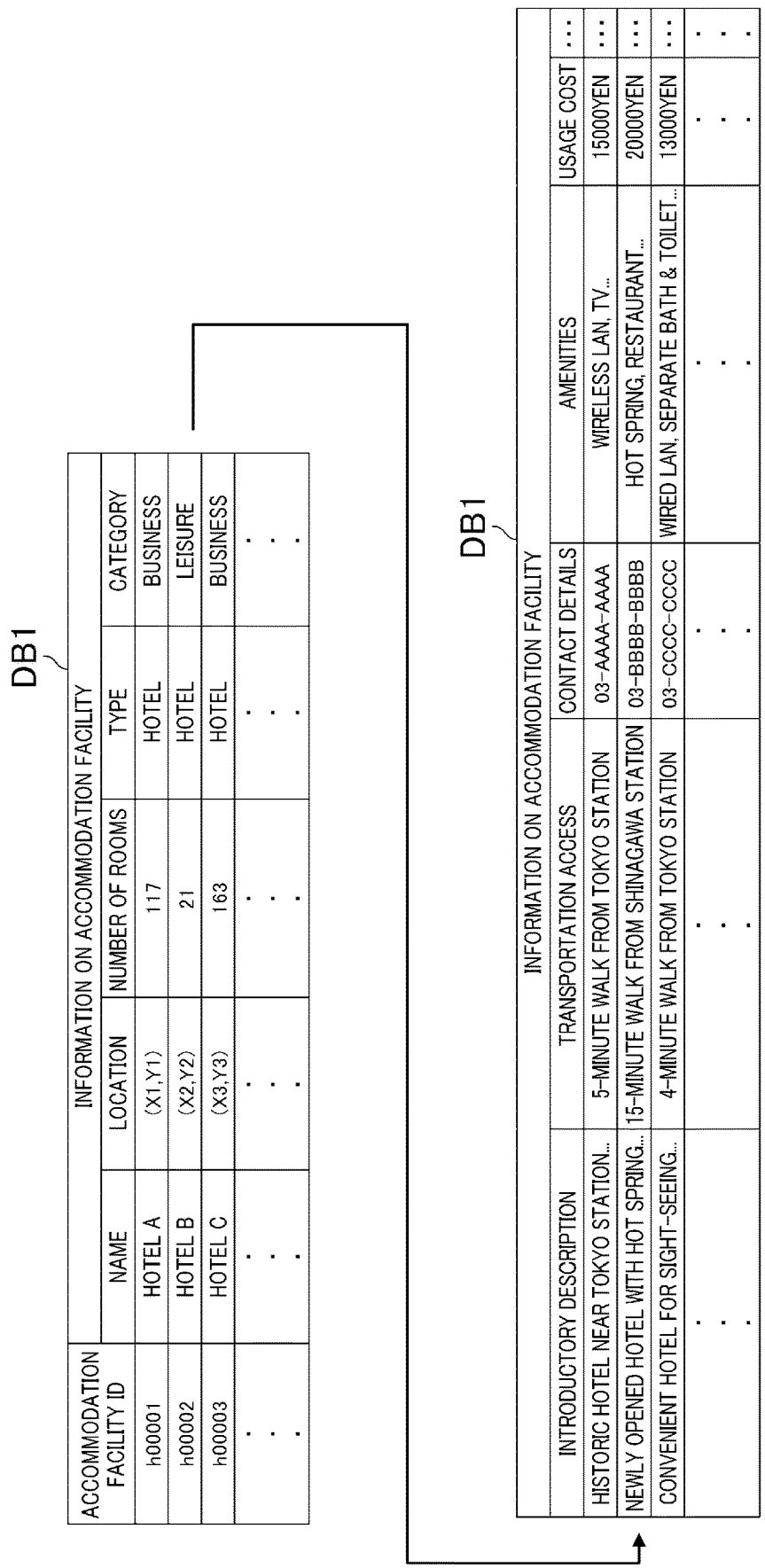
FIG. 8 is a table for showing a data storage example of an accommodation facility database.

FIG. 8 is a table for showing a data storage example of the accommodation facility database DB1. As shown in FIG. 8, in the accommodation facility database DB1, various types of information on accommodation facilities are stored. In this embodiment, the accommodation facility page P3 corresponds to a data item. The accommodation facility page P3 is displayed based on the information stored in the accommodation facility database DB1, and hence the accommodation facility database DB1 can be called a database in which data items are stored.

For example, the accommodation facility database DB1 stores an accommodation facility ID for uniquely identifying each accommodation facility, the name, location, number of rooms, type, category, introductory description, transportation access, contact details, amenities, and usage cost of the accommodation facility. Each piece of information is represented by a character string or a numerical value. For example, as the location, information such as geolocation, latitude and longitude information, or base station information may be used. As the transportation access, for example, information such as a travel time from a train station or a highway interchange, or a travel time from a major city, may be used.

The information stored in the accommodation facility database DB1 may be used as an index at the time of the search. The information stored in the accommodation facility database DB1 is not limited to the example of FIG. 8, and for example, information such as an image, a moving image, an average price range, or a review of the accommodation facility may also be stored.

FIG. 9 is a table for showing a data storage example of the action history database DB2. As shown in FIG. 9, an action history of each of a plurality of users is stored in the action history database DB2. The action history of all users using the information processing system 1 may be stored in the action history database DB2, or the action history of a part of those users may be stored.

The action history is a record of an action on a data item. In other words, the action history is a log of the actions by the user. An action is a behavior performed on a data item. Examples may include viewing, reserving, using, and purchasing.

Viewing is the action of the user visually recognizing the details of a data item, and involves displaying the details of a part or all of the data item on the user terminal 20 and transmitting the part or all of the data item from the server 10 to the user terminal 20. When the data item is a moving image, watching the moving image is an example of viewing. Reserving is the action of reserving the facility or service related to the data item. Using is the action of using the facility or service related to the data item. When the data item is a sound, listening to the sound is an example of using. Purchasing is the action of purchasing the product or service related to the data item. The product may be a physical product, or may be an electronic product such as a piece of music, a moving image, or an application.

In this embodiment, viewing or reserving is described as an example of the action, and a viewing history or a reservation history is described as an example of the action history. When using or purchasing corresponds to the action, the usage history or the purchase history corresponds to the action history.

For example, the action history database DB2 is configured to store a user ID for uniquely identifying each user, an accommodation facility ID of the viewed or reserved accommodation facility, action details indicating one of viewing and reserving, and the action date and time. The action date and time is the date and time when the user performed the action, and may be, for example, the date and time at which the accommodation facility page P3 is viewed, or the date and time at which the reservation of the accommodation facility is received.

The action history database DB2 is updated every time each user performs an action. For example, when displaying the accommodation facility page P3 on the user terminal 20, the server 10 stores the accommodation facility ID of the accommodation facility in association with the user ID of that user terminal 20. In this case, the action details are "view". As the action date and time, the date and time at which the data of the accommodation facility page P3 is transmitted, the date and time at which the data of the accommodation facility page P3 is generated, or the date and time at which a display request of the accommodation facility page P3 is received may be stored, or a date and time slightly before or after each of those combinations of date and time may be stored.

For example, when the server 10 receives a reservation of the accommodation facility from the user terminal 20, the server 10 stores the accommodation facility ID of the accommodation facility in association with the user ID of that user terminal 20. In this case, the details of the action are "reserve". As the action date and time, the date and time at which the reservation processing is executed or the date and time at which the reservation is received may be stored, or a date and time slightly before or after each of those combinations of date and time may be stored.

In FIG. 9, there is shown a case in which the viewing history and the reservation history are stored in the same database, but the viewing history and the reservation history may be stored in separate databases. The action history database DB2 may also be configured so that only one of the viewing history, the reservation history, the usage history, and the purchase history is stored.

FIG. 10 is a table for showing a data storage example of the score database DB3. As shown in FIG. 10, the score database DB3 is configured to store a score indicating relevance between a plurality of accommodation facilities.

Relevance is a relation or connection between accommodation facilities. For example, similarity in the details of the accommodation facilities corresponds to the presence of relevance. For this reason, relevance can also be called similarity. For example, a situation in which there is a high likelihood that a user who has viewed or reserved a given accommodation facility will view or reserve another accommodation facility corresponds to the presence of relevance. As another example, a situation in which there is a high likelihood that a user who is interested in a given accommodation facility will also be interested in another accommodation facility corresponds to the presence of relevance.

The score is information indicating the level of relevance. In other words, the score is a related likelihood, probability, or certainty. The score may be represented by using numerical values or symbols. When the score is represented by using symbols, a symbol such as S, A, B, or C representing the level of the score may be used. In this embodiment, there is described a case in which the score is represented by using numerical values. As the score becomes higher, the relevance becomes higher, and as the score becomes lower, the relevance becomes lower.

For example, in the score database DB3, a score is stored for each combination of accommodation facility IDs. The combination of accommodation facility IDs is a set of two accommodation facility IDs. The score represents the relevance between one of the two accommodation facilities (first accommodation facility) and the other (second accommodation facility).

The score acquired by one of the first information acquisition module 102 and the second information acquisition module 105 is stored in the score database DB3. In other words, in the score database DB3, a score obtained by one of collaborative filtering and content-based filtering is stored. Details on the score to be stored are described later.

In this embodiment, there is described a case in which one score is calculated for every two accommodation facilities, but one score may be calculated for every three or more accommodation facilities. Specifically, the word "plurality" in "score indicating the relevance between a plurality of accommodation facilities" may mean two, or may mean three or more. The score database DB3 may store the scores of combinations of all the accommodation facilities or may store the scores of combinations of a part of the accommodation facilities.

FIG. 11 is a diagram for showing a data storage example of the coupon database DB4. As shown in FIG. 11, accommodation facility coupons are stored in the coupon database DB4. A coupon is an electronic discount voucher, a usage voucher, or an exchange voucher. For example, the user can acquire a coupon displayed in the display area A21 by selecting that coupon.

For example, the coupon database DB4 is configured to store a coupon ID for uniquely identifying each coupon, the accommodation facility ID of the accommodation facility where the coupon is to be used, and the details of the coupon. As the details of the coupon, a discount amount or a discount rate for the accommodation facility may be stored, or information so that the coupon enables use with no charge or can be exchanged for a product or service may be stored.

The data stored in the data storage unit 100 is not limited to the above-mentioned example. For example, the data storage unit 100 may store a user database configured to store information on each user. The information stored in the user database may be basic information such as a user ID, name, gender, date of birth, or e-mail address, or the coupon ID of a coupon acquired by the user may be stored. For example, the data storage unit 100 may store the parameter of the output module 103 to be described later.

[3-2. Identification Module]

The identification module 101 is mainly implemented by the CPU 11. The identification module 101 is configured to identify, based on the action history of each of a plurality of users, a plurality of accommodation facilities having a predetermined degree of action or more.

The degree of action is the number or frequency of actions. In this embodiment, viewing or reserving corresponds to the action, and hence the number of views, viewing frequency, the number of reservations, or reservation frequency corresponds to the degree of action. When using or purchasing corresponds to the action, the number of uses, the usage frequency, the number of purchases, or the purchase frequency corresponds to the degree of action. The predetermined degree can be set to any degree, and may be a fixed value or a variable value. The information indicating the predetermined degree is assumed to be stored in the data storage unit 100.

In this embodiment, there is described an example in which the sum of the number of views and the number of reservations is the degree of action, and the top 10% of that sum is the predetermined degree. The predetermined degree is not limited to the top 10%, and may be, for example, about the top 1% to 9% or about the top 11% to 50%. The predetermined degree can also be referred to as a threshold value of the number of views, the viewing frequency, the number of reservations, or the reservation frequency.

The identification module 101 is configured to aggregate the sum of the number of views and the number of reservations for each accommodation facility based on the action history database DB2. In this embodiment, there is described a case in which the identification module 101 aggregates the sum value of the number of views and the number of reservations for each accommodation facility without particularly distinguishing between views and reservations, but the sum value may also be aggregated by applying a weighting to each of the views and the reservations. For example, a reservation weighting coefficient may be set to be larger than a view weighting coefficient. In a case in which a given user has repeatedly viewed or reserved the same accommodation facility, for example, the identification module 101 may add the number of views or the number of reservations each time the user views or reserves that accommodation facility, and in this case, the number of views or the number of reservations may be regarded as being one time.

The aggregation period may be an entire past period or a partial period. When a partial period is to be the aggregation period, the period may be any period, for example, a period from about the last several days to about several months.

The identification module 101 identifies a plurality of accommodation facilities having a sum in the top 10% based on the aggregation result. When aggregating the sums of each accommodation facility, the identification module 101 identifies the accommodation facilities in descending order of their sums, and repeats the identification of the accommodation facilities until 10% of the total number of accommodation facilities have been identified. The identification module 101 temporarily records in the data storage unit 100 the accommodation facility IDs of the accommodation facilities having a sum in the top 10%. A score is acquired for those accommodation facilities by the first information acquisition module 102, which is described below.

[3-3. First Information Acquisition Module]

The first information acquisition module 102 is mainly implemented by the CPU 11. The first information acquisition module 102 is configured to acquire, based on the action history of each user, a score indicating the relevance between the respective accommodation facilities identified by the identification module 101. In this embodiment, the score acquired by the first information acquisition module 102 is an example of first information.

The first information acquisition module 102 acquires, based on the action history of each user for those accommodation facilities, a score for each combination of the accommodation facilities identified by the identification module 101. As the method of acquiring the score, various methods may be applied, and for example a score counting algorithm used in collaborative filtering may be used.

The first information acquisition module 102 calculates the score of each accommodation facility by referring to the action history of each user stored in the action history database DB2 and inputting the action history into an algorithm. The score acquired by the first information acquisition module 102 is a score based on collaborative filtering.

The score is higher in a case in which a user who viewed or reserved one of the accommodation facilities of the combination is also viewing or reserving the other accommodation facility, and when that is not the case, the score is lower. When there are more users who view or use both of the accommodation facilities of the combination, the score is higher, and when there are fewer users who view or reserve both of the accommodation facilities of the combination, the score is lower.

The first information acquisition module 102 may acquire the number of users who are viewing or reserving both accommodation facilities of the combination as a score as is, or calculate the score by substituting the number of the users into a predetermined mathematical expression. When both accommodation facilities of the combination are reserved, the score may be set to be higher than when both accommodation facilities are viewed.

[3-4. Output Module]

The output module 103 is mainly implemented by the CPU 11. The output module 103 is configured to output, when the details of each of a plurality of accommodation facilities are input, a score indicating the relevance between the respective accommodation facilities based on a predetermined parameter. In this embodiment, the score output by the output module 103 is an example of second information.

The details of the accommodation facility are information on the accommodation facility, and are represented by, for example, a character string, a numerical value, or vector information. In other words, the details of the accommodation facility are the pieces of information stored in the accommodation facility database DB1 (information displayed on accommodation facility page P3), and are the features of the accommodation facility.

The parameters are numerical values to be used in the calculation of the score, and are the coefficients in the calculation expressions. The output module 103 includes an algorithm for calculating the score, and the parameters are the coefficients of the expressions included in the algorithm. As the algorithm, various content-based filtering algorithms are applicable. For example, an algorithm used in supervised machine learning may be applied. The score output by the output module 103 is a score based on content-based filtering. In this embodiment, the output module 103 calculates the score based on the calculation expression in the next paragraph.

$$F(H_1,H_2)=a_1{}^*f_1(H_1,H_2)+a_2{}^*f_2(H_1,H_2)+a_3{}^*f_3(H_1,H_2)+a_4{}^*f_4(H_1,H_2)+a_5{}^*f_5(H_1,H_2)+a_6{}^*f_6(H_1,H_2)$$

In the calculation expression, $H_1$ and $H_2$ are accommodation facilities. $H_1$ is one of the accommodation facilities of the combination (first accommodation facility), and $H_2$ is the other (second accommodation facility). $F(H_1, H_2)$ on the left side of the expression is a score based on content-based filtering.

On the right side of the expression, $a_1$ to $a_6$ are parameters, and in this example, are coefficients of functions $f_1(H_1, H_2)$ to $f_6(H_1, H_2)$. In this embodiment, parameters $a_1$ to $a_6$ are set by the setting module 104 to be described later. The functions $f_1(H_1, H_2)$ to $f_6(H_1, H_2)$ are functions into which a numerical value indicating the details of the accommodation facility $H_1$ and a numerical value indicating the details of the accommodation facility $H_2$ are substituted, from which the relevance between the substituted details is calculated. The numerical value indicating the details can also be referred to as a feature amount.

The function $f_1(H_1, H_2)$ is used for calculating the relevance between the location of the accommodation facility $H_1$ and the location of the accommodation facility $H_2$. The location relevance represents the proximity of the locations, and is the distance between the accommodation facilities $H_1$ and $H_2$. As the location becomes closer, the relevance is higher, and as the location becomes farther away, the relevance is lower. More specifically, as the distance becomes shorter, the relevance becomes higher, and as the distance becomes longer, the relevance becomes lower.

For example, when the geolocation is used for the location, the function $f_1(H_1, H_2)$ calculates the difference between the numerical value indicated by the geolocation of the accommodation facility $H_1$ and the numerical value indicated by the geolocation of the accommodation facility $H_2$. As the difference becomes smaller, a higher numerical value is output, and as the difference becomes larger, a lower numerical value is output. For example, when latitude and longitude information is used for the location, the function $f_1(H_1, H_2)$ calculates the distance between the latitude and longitude information on the accommodation facility $H_1$ and the latitude and longitude information on the accommodation facility $H_2$. As the calculated distance becomes shorter, a higher numerical value is output, and as the distance becomes longer, a lower numerical value is output.

The function $f_2(H_1, H_2)$ is used for calculating the relevance between the number of rooms of the accommodation facility $H_1$ and the number of rooms of the accommodation facility $H_2$. The number of rooms relevance represents the difference in the number of rooms, which is the difference in the scale of the accommodation facilities. As the difference in the number of rooms becomes smaller, the relevance becomes higher, and as the difference in the number of rooms becomes larger, the relevance becomes lower. For example, the function $f_2(H_1, H_2)$ calculates the difference between the number of rooms of the accommodation facility $H_1$ and the number of rooms of the accommodation facility $H_2$, and outputs a higher numerical value as the difference becomes smaller, and a lower numerical value as the difference becomes larger.

The function $f_3(H_1, H_2)$ is used for calculating the relevance between the type of the accommodation facility $H_1$ and the type of the accommodation facility $H_2$. The type relevance represents the level of sameness of the type. The relevance is high when the type is the same, and the relevance is low when the type is different. For example, the function $f_3(H_1, H_2)$ outputs a first value (e.g., 1) when the type of the accommodation facility $H_1$ and the type of the accommodation facility $H_2$ match, and outputs a second value (e.g., 0) when the type of the accommodation facility $H_1$ and the type of the accommodation facility $H_2$ do not match.

The function $f_4(H_1, H_2)$ is used for calculating the relevance between the category of the accommodation facility $H_1$ and the category of the accommodation facility $H_2$. The category relevance represents the level of sameness of the category. The relevance is high when the category is the same, and the relevance is low when the category is different. For example, the function $f_4(H_1, H_2)$ outputs a first value (e.g., 1) when the category of the accommodation facility $H_1$ and the category of the accommodation facility $H_2$ match, and outputs a second value (e.g., 0) when the category of the accommodation facility $H_1$ and the category of the accommodation facility $H_2$ do not match.

The function $f_5(H_1, H_2)$ is used for calculating the relevance between the feature of the accommodation facility $H_1$ and the feature of the accommodation facility $H_2$. The feature relevance represents the degree of similarity between the features. The features may be represented by vector information or numerical values. For example, the function $f_5(H_1, H_2)$ outputs the degree of similarity between the feature of the accommodation facility $H_1$ and the feature of the accommodation facility $H_2$.

For example, when the feature is represented by vector information, the function $f_5(H_1, H_2)$ calculates the distance between the vector information indicating the feature of the accommodation facility $H_1$ and the vector information indicating the feature of the accommodation facility $H_2$. As the distance becomes shorter, a higher numerical value is output, and as the distance becomes longer, a lower numerical value is output. For example, when the feature is represented by a numerical value, the function $f_5(H_1, H_2)$ calculates the difference between the numerical value indicating the feature of the accommodation facility $H_1$ and the numerical value indicating the feature of the accommodation facility $H_2$. As the difference becomes smaller, a higher numerical value is output, and as the difference becomes larger, a lower numerical value is output.

The function $f_6(H_1, H_2)$ is used for calculating the relevance between the transportation access of the accommodation facility $H_1$ and the transportation access of the accommodation facility $H_2$. The transportation access relevance represents the degree of similarity in transportation access. For example, the transportation access may be indicated by the travel time from a train station or a bus stop, or the travel time from a major city or highway interchange. As the difference between the travel times becomes smaller, the relevance becomes higher, and as the difference between the travel times becomes larger, the relevance becomes lower. For example, the function $f_6(H_1, H_2)$ calculates the difference between the travel time for the accommodation facility $H_1$ and the travel time for the accommodation facility $H_2$. As the difference becomes smaller, a higher numerical value is output, and as the difference becomes larger, a lower numerical value is output.

There has been described above a case in which the score is calculated based on the details of six items, but the number of items of the details to be used in the calculation of the score may be arbitrary. For example, the score may be calculated based on the details of only one item, or may be calculated based on the details of 2 to 5 items or 7 or more items. The items used in the calculation of the score are not limited to the above-mentioned example, and the score may be calculated based on any information stored in the accommodation facility database DB1. For example, the score may be calculated based on information such as contact details, amenities, usage cost, or reviews of the accommodation facility.

[3-5. Setting Module]

The setting module 104 is mainly implemented by the CPU 11. The setting module 104 is configured to set parameters based on the details of each accommodation facility identified by the identification module 101 and the score (score acquired by first information acquisition module 102).

The setting module 104 refers to the accommodation facility database DB 1, and acquires the details of each accommodation facility identified by the identification module 101. The setting module 104 acquires the score acquired by the first information acquisition module 102. The setting module 104 sets a parameter so that, when the details of each accommodation facility identified by the identification module 101 are input to the output module 103, the score of the corresponding accommodation facility or a score similar to the score is output. A similar score is a score for which the difference is less than a predetermined value.

For example, the setting module 104 uses the details of each acquired accommodation facility as input, generates teacher data in which the acquired score is an output, and sets the parameter based on the teacher data. As the setting method based on teacher data, various methods used in supervised machine learning are applicable. For example, linear regression, polynomial regression, or non-linear regression may be used. The setting module 104 sets the parameter of the output module 103 so that a relationship between the input and output indicated by the teacher data is obtained. The setting of the parameter can also be referred to as learning of an algorithm by the output module 103.

In this embodiment, the parameters are the coefficients indicated by $a_1$ to $a_6$, and hence the setting module 104 sets the parameters $a_1$ to $a_6$ based on the teacher data. For example, the setting module 104 performs linear regression by plotting the relationship between the input and the output indicated by the teacher data in n (n being a natural number) dimensional space, and sets the parameters $a_1$ to $a_6$ of the function $F(H_1, H_2)$ so as to obtain the relationship between the plotted input and output.

[3-6. Second Information Acquisition Module]

The second information acquisition module 105 is mainly implemented by the CPU 11. The second information acquisition module 105 is configured to input the details of each of the plurality of accommodation facilities to the output module 103, and to acquire a score. The second information acquisition module 105 may acquire the score of all of the combinations of the accommodation facilities or acquire the score of a part of the combinations of the accommodation facilities.

In the case of acquiring the score of a part of the combinations of the accommodation facilities, the second information acquisition module 105 may acquire the score of the combinations of the accommodation facilities for which a score was not acquired by the first information, or may acquire the score of randomly-determined combinations of the accommodation facilities. As another example, the second information acquisition module 105 may acquire the score of combinations of the accommodation facilities having a coupon stored in the coupon database DB4.

The second information acquisition module 105 refers to the score database DB3, and determines a combination of accommodation facilities for which scores are to be obtained. The second information acquisition module 105 refers to the accommodation facility database DB1, and acquires the details of each of the determined accommodation facilities. When the second information acquisition module 105 inputs the acquired details to the output module 103, the output module 103 calculates the score based on the input details. The second information acquisition module 105 acquires the score output from the output module 103. The second information acquisition module 105 stores the acquired score in the score database DB3.

In the example of this embodiment, the second information acquisition module 105 acquires information on the location, the number of rooms, the type, the category, the features, and the transportation access of each of the accommodation facilities $H_1$ and $H_2$, and inputs each of those pieces of information to the output module 103. The feature may be calculated from a feature vector of each keyword extracted from the introductory description of the accommodation facility, or may be calculated based on the amenities or the usage cost. For example, the output module 103 calculates the score based on each piece of input information and the above-mentioned expression. The method of calculating the score is as described above.

[3-7. Providing Module]

The providing module 106 is mainly implemented by the CPU 11. The providing module 106 is configured to provide, based on the score of each accommodation facility for which a score (score acquired by second information acquisition module 105) has been acquired, information on another accommodation facility related to the accommodation facility.

The another accommodation facility related to the accommodation facility is an accommodation facility having a high score (high-relevance accommodation facility), and is, for example, the accommodation facility having the highest score, an accommodation facility having a score equal to or more than a threshold value, or when the accommodation facilities are ranked in descending order of score, an accommodation facility of a predetermined ranking.

The information on the accommodation facility may be any information on the accommodation facility, for example, a coupon of the accommodation facility, a link to the accommodation facility page P3, or information such as the name, an image, or an introductory description of the accommodation facility. In this embodiment, the coupon is an example of information on the data item.

The term providing means giving to the user, displaying on the user terminal 20, transmitting to the email address of the user, transmitting to the account of the user in a messaging application, SNS, or the like, or associating information with the user ID. In other words, provision can also be referred to as a recommendation to the user.

The providing module 106 refers to the score database DB3, and acquires the score of the accommodation facility serving as a query. The accommodation facility serving as a query may be determined in any manner. For example, the accommodation facility serving as the query may be an accommodation facility viewed or reserved in the past by the user, or may be a randomly determined accommodation facility. As another example, any of the accommodation facilities retrieved based on the search condition by the user may serve as the query. One or a plurality of accommodation facilities may serve as the query.

The providing module 106 identifies another related accommodation facility based on the score of the accommodation facility serving as the query. In order to simplify the description, the providing module 106 identifies another accommodation facility having the highest score. The providing module 106 refers to the coupon database DB4, and determines whether or not there is a coupon in which the accommodation facility ID of the identified another accommodation facility is stored. When there is a coupon, the providing module 106 provides the coupon. When there is no coupon, the providing module 106 determines whether or not there is a coupon of the accommodation facility having the next highest score. The determination of whether or not there is a coupon may be repeated until a coupon is found.

The providing module 106 may provide a coupon based on the score acquired by the second information acquisition module 105 for all the accommodation facilities, or may provide a coupon based on the score acquired by the second information acquisition module 105 for only a part of the accommodation facilities.

For example, the providing module 106 provides a coupon based on the score acquired by the first information acquisition module 102 for an accommodation facility having a degree of action equal to or more than a predetermined degree. More specifically, a more accurate filtering score can be calculated by collaborative filtering for an accommodation facility that is frequently viewed or reserved, and hence the providing module 106 provides a coupon based on a score based on collaborative filtering.

The providing module 106 also provides, for example, a coupon based on the score acquired by the second information acquisition module 105 for an accommodation facility having a degree of action less than a predetermined degree. More specifically, for accommodation facilities that are not frequently viewed or reserved, the accuracy of a score based on collaborative filtering is not high. Therefore, the providing module 106 provides a coupon based on a score (score output by output module 103) based on content-based filtering in which the parameter is set by the setting module 104.

In this embodiment, the providing module 106 is configured to provide, based on the score of an accommodation facility on which an action has been performed by the user, the user with the coupon of another accommodation facility related to that accommodation facility. Specifically, in this embodiment, the accommodation facility serving as the query is an accommodation facility that a user has viewed or reserved. The providing module 106 refers to the action history database DB2, and identifies the accommodation facilities viewed or reserved by each user. The providing module 106 refers to the score database DB3, and acquires the score of those accommodation facilities. The providing module 106 identifies other related accommodation facilities based on the acquired score. The providing module 106 refers to the coupon database DB4, and provides the coupon of the other identified accommodation facilities.

4. Processing to be Executed by Information Processing System

Next, the processing to be executed by the information processing system 1 is described. In this example, update processing for updating a parameter and presentation processing for presenting a coupon to the user terminal 20 are described.

[4-1. Update Processing]

Figure 12:
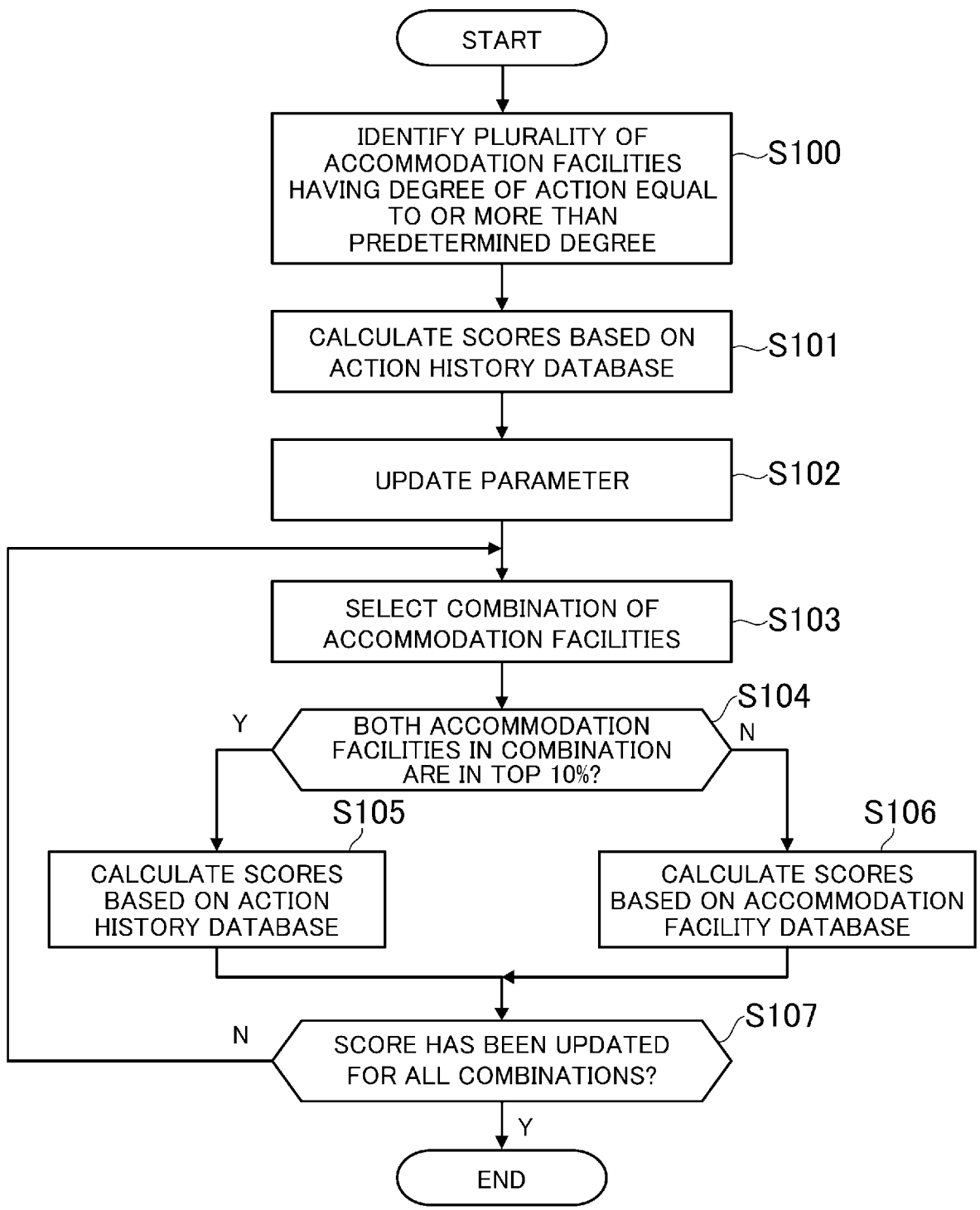
FIG. 12 is a flowchart for illustrating an example of update processing.

FIG. 12 is a flowchart for illustrating an example of the update processing. The processing illustrated in FIG. 12 is executed by the CPU 11 operating in accordance with a program stored in the memory 12. The processing described below is an example of processing executed by the functional blocks illustrated in FIG. 7.

As illustrated in FIG. 12, first, the CPU 11 identifies, based on the action history database DB2, a plurality of accommodation facilities having a degree of action equal to or more than a predetermined degree (Step S100). In Step S100, the CPU 11 aggregates the sums of the number of views and the number of reservations of each accommodation facility, and identifies the accommodation facilities having a sum in the top 10%.

The CPU 11 calculates, based on the action history database DB2, the scores of the plurality of accommodation facilities identified in Step S100 (Step S101). In Step S101, the CPU 11 calculates a score based on collaborative filtering for each combination of the accommodation facilities identified in Step S100.

The CPU 11 updates the parameter to be used in the content-based filtering score calculation based on the accommodation facility database DB1 and the scores calculated in Step S101 (Step S102). In Step S102, the CPU 11 uses the details of each accommodation facility identified in Step S101 as input, generates teacher data in which the score of each accommodation facility calculated in Step S102 is an output, and updates the parameter based on the teacher data.

The CPU 11 selects, based on the score database DB3, a combination of accommodation facilities for which a score is to be calculated (Step S103). In Step S103, any two accommodation facilities are selected from among the accommodation facilities having an accommodation facility ID stored in the score database DB3.

The CPU 11 determines, based on the action history database DB2, whether or not the combination of the accommodation facilities selected in Step S103 is a combination in which, for both accommodation facilities, the sum of the number of views and the number of reservations is in the top 10% (Step S104). In Step S104, the CPU 11 determines whether or not both of the accommodation facilities selected in Step S103 are accommodation facilities identified in Step S100.

When it is determined that both of the accommodation facilities of the combination are in the top 10% (Step S104: Y), the CPU 11 calculates, based on the action history database DB2, the scores of the accommodation facilities selected in Step S103, and stores the calculated scores in the score database DB3 (Step S105). In Step S105, the CPU 11 acquires the score calculated in Step S100 (score based on collaborative filtering) for the combination of the accommodation facilities selected in Step S103, and stores the acquired score in the score database DB3.

Moreover, when it is determined that at least one of the accommodation facilities of the combination is not an accommodation facility in the top 10% (Step S104: N), the CPU 11 calculates, based on the accommodation facility database DB1, the score of the accommodation facilities selected in Step S104, and stores the calculated scores in the score database DB3 (Step S106). In Step S106, the CPU 11 calculates, based on the parameter updated in Step S102, a score based on content database filtering, and stores the calculated score in the score database DB3.

The CPU 11 determines, based on the score database DB3, whether or not the score has been updated for all the combinations of the accommodation facilities (Step S107). In Step S107, the CPU 11 determines whether or not the score has been updated for all the combinations of accommodation facility IDs stored in the score database DB3.

When it is not determined that the score has been updated for all the combinations of the accommodation facilities (Step S108: N), the processing returns to Step S103, and the score of another combination is calculated. Moreover, when it is determined that the score has been updated for all the combinations of the accommodation facilities (Step S107: Y), the processing ends.

[4-2. Presentation Processing]

Figure 13:
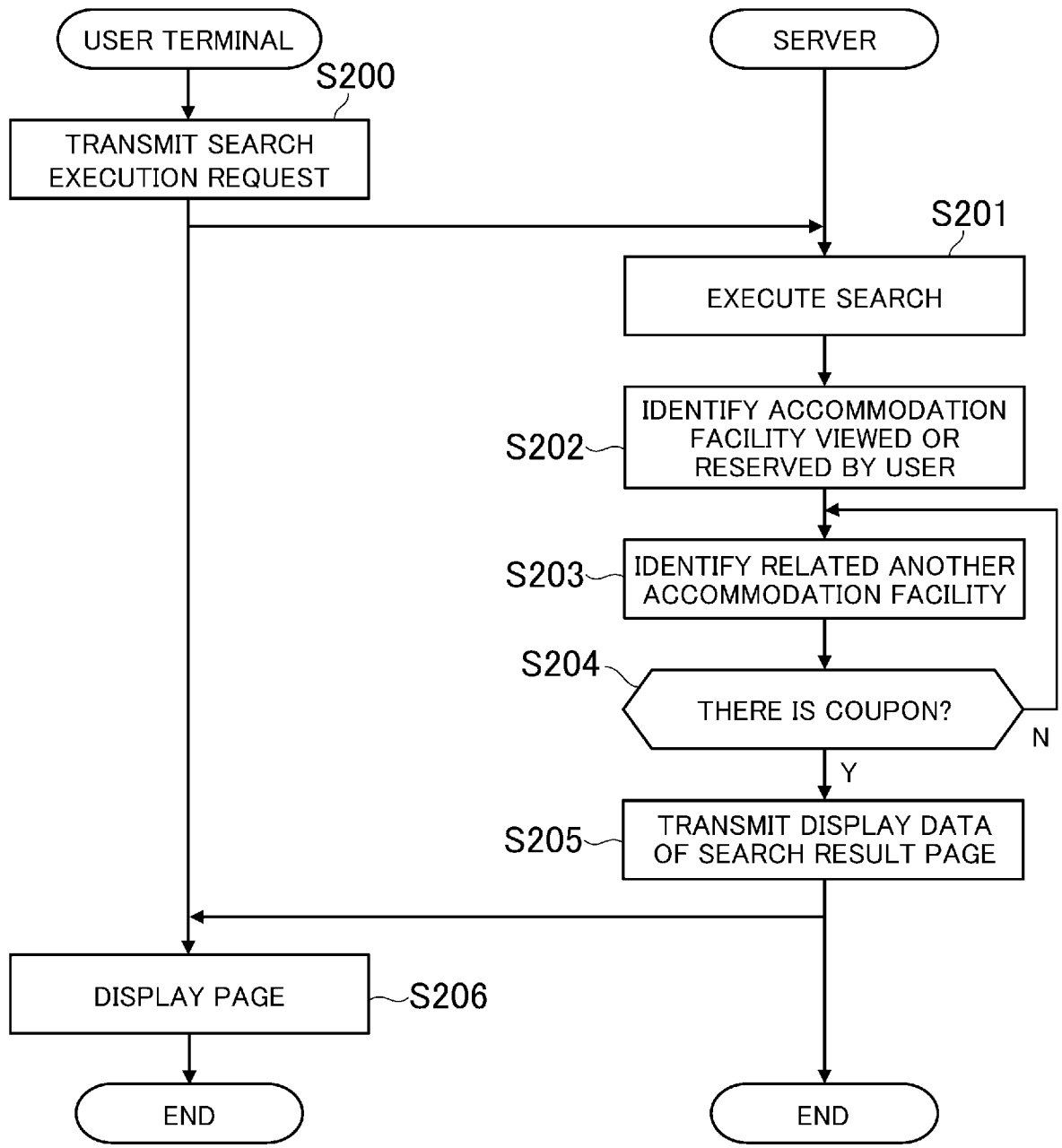
FIG. 13 is a flowchart for illustrating an example of presentation processing.

FIG. 13 is a flowchart for illustrating an example of presentation processing. The processing illustrated in FIG. 13 is executed by the CPU 11 operating in accordance with a program stored in the memory 12 and the user terminal 20 operating in accordance with a program stored in user terminal 20. The processing described below is an example of processing executed by the functional blocks illustrated in FIG. 7. In this embodiment, the coupon is displayed on the search result page P2, and hence the processing described below is executed when the search condition has been input in the top page P1 and the button B15 has been selected.

As illustrated in FIG. 13, first, the user terminal 20 transmits a search execution request to the server 10 (Step S200). In Step S200, the user terminal 20 transmits a search execution request together with the search condition input to each of the input forms F10 to F14. The user ID of the user terminal 20 is also transmitted together with the search execution request.

In the server 10, when the execution request is received, the CPU 11 executes a search based on the accommodation facility database DB1 (Step S201). In Step S201, using the search condition received from the user terminal 20 as a query, the CPU 11 executes a search using the information on each accommodation facility stored in the accommodation facility database DB1 as an index. The CPU 11 temporarily stores in the memory 12 the accommodation facility ID of the accommodation facilities retrieved in the search.

The CPU 11 identifies, based on the action history database DB2, an accommodation facility viewed or reserved by the user (Step S202). In Step S202, the CPU 11 may identify, based on the action history related to the user ID of the user who issued the search execution request, an accommodation facility that has been viewed or reserved over the entire past period, or an accommodation facility that has been viewed or reserved over a partial period. For example, the period may be a period from about the last several days to about several months, or the CPU 11 may identify a predetermined number of the most recent accommodation facilities that have been viewed or reserved.

The CPU 11 identifies, based on the score database DB3, another accommodation facility related to the accommodation facility identified in Step S202 (Step S203). In Step S203, the CPU 11 refers to the score of each accommodation facility identified in Step S202, and identifies the another accommodation facility having the highest score. As another example, the CPU 11 may identify a predetermined number of the another accommodation facilities in descending order of score, or may identify all of the another accommodation facilities having a score equal to or more than a threshold value. The CPU 11 temporarily stores in the memory 12 the accommodation facility ID of each of the another accommodation facilities that have been identified.

The CPU 11 determines, based on the coupon database DB4, whether or not there is a coupon of the accommodation facility identified in Step S203 (Step S204). In Step S204, the CPU 11 determines whether or not the accommodation facility ID of the accommodation facility identified in Step S203 is present in the coupon database DB4.

When it is determined that there is no coupon (Step S204: N), the processing returns to Step S203. In this case, the another accommodation facility having the next highest score is identified, and it is determined whether or not there is a coupon of that accommodation facility.

Moreover, when it is determined that there is a coupon (Step S204: Y), the CPU 11 arranges the search results of Step S201 in the display area A20 and transmits the display data of the search result page P2 in which the coupon is arranged in the display area A21 to the terminal 20 (Step S205). The display data of the search result page P2 is assumed to be stored in advance in the memory 12. The display data may be HTML data, or an image or text embedded in a frame.

When the display data is received, the user terminal 20 displays the search result page P2 (Step S206), and the processing ends. The user can then select the accommodation facility from the display area A20 to display the accommodation facility page P3, or can select the coupon displayed in the display area A21 to obtain the coupon.

With the information processing system 1 described above, through setting the parameter of the output module 103 based on the details of an accommodation facility that is frequently viewed or reserved and a score based on collaborative filtering, even for an accommodation facility that is not frequently viewed or reserved, it is possible to calculate a highly accurate score on the assumption that the accommodation facility is frequently viewed or reserved, and to increase the accuracy of identifying an accommodation facility having high relevance. In other words, even when content-based filtering is used, the information processing system 1 can calculate a score (score that also takes into account user preference) with almost the same degree of accuracy as collaborative filtering, and can increase the accuracy of identifying an accommodation facility having high relevance. Further, through automating the setting processing of the content-based filtering parameter, it is possible to the save time and effort involved in manually setting the parameter.

For accommodation facilities that are not frequently viewed or reserved, the output module 103 is caused to calculate the score, but a score based on collaborative filtering is not calculated, and scores having low accuracy are not calculated. This enables the execution of unnecessary processing to be prevented, thereby reducing the processing load on the server 10. For accommodation facilities that are frequently viewed or reserved, collaborative filtering is used, and the output module 103 does not calculate the score. This enables the execution of unnecessary score calculation to be prevented, thereby reducing the processing load on the server 10. Further, scores having low accuracy are not stored in the score database DB3. Therefore, unnecessary scores are prevented from being stored, which enables the memory consumption of the server 10 to be reduced.

In addition, through providing a coupon based on the score acquired from the output module 103, the accuracy of the provided coupon can be increased. For example, in a long tail method of increasing sales by arranging a large number of services or products even when the services or products have few reservation opportunities or purchase opportunities, a score having high accuracy can be acquired by collaborative filtering as long as the services or products are frequently viewed or reserved, but a score having high accuracy is not acquirable while the services or products are not frequently viewed or reserved. In this case, for services or products that are not frequently viewed or reserved, a coupon may not be provided at all or a coupon may be provided that is not in line with the preference of the user. In contrast, with the information processing system 1, even for services or products that are not frequently viewed or reserved, a coupon can be provided with high accuracy, and hence the effect of the long tail can be exhibited to the maximum.

Still further, through providing the coupon by using a score based on more accurate collaborative filtering for accommodation facilities that are frequently viewed or reserved, and providing the coupon by using a score acquired from the output module 103 for accommodation facilities that are not frequently viewed or reserved, the accuracy of the provided coupon can be effectively improved.

Based on the score associated with an accommodation facility viewed or reserved by a user, a coupon of another accommodation facility related to the accommodation facility viewed or reserved by the user can be provided to each user.

5. Modification Examples

The present invention is not limited to the at least one embodiment described above, and can be modified suitably without departing from the spirit of the present invention.

Figure 14:
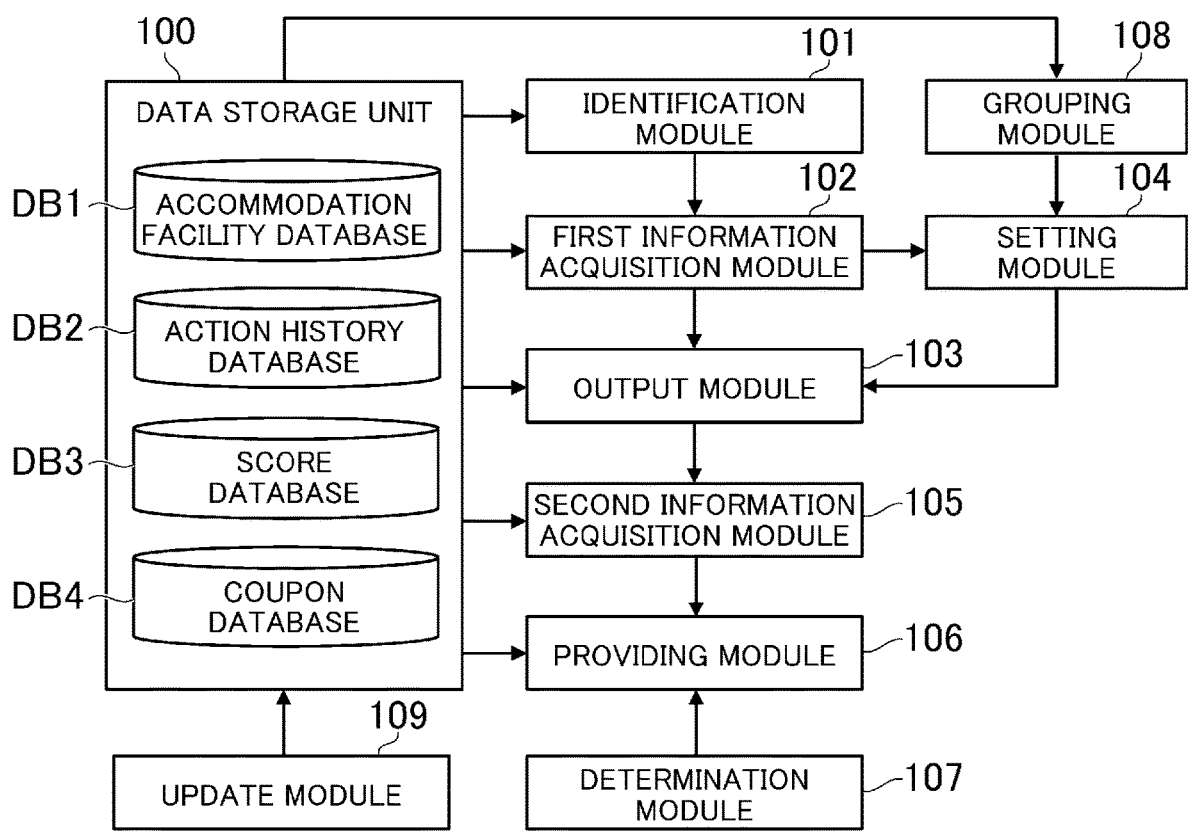
FIG. 14 is a functional block diagram for illustrating at least one modification example of the present invention.

FIG. 14 is a functional block diagram of at least one modification example. As illustrated in FIG. 14, in the at least one modification example described below, a determination module 107, a grouping module 108, and an update module 109 are implemented.

(1) For example, the coupon may be provided to a specific user, and not to all users. For example, the coupon may be provided to a user who has used the coupon in the past, a user having a high degree of action, or a user who reserves a particular type of accommodation facility. In other words, the coupon may be provided only to a user who is highly likely to use the coupon.

In the information processing system 1 of Modification Example (1), the determination module 107 is implemented. The determination module 107 is mainly implemented by the CPU 11. The determination module 107 is configured to determine, based on the action history of each user, the users to be provided with the coupon. The determination module 107 determines whether or not a predetermined condition is satisfied based on the action history of each user, and determines whether or not the user is a target to be provided with the coupon, based on the determination result.

The conditions for determining whether or not a user is a target to be provided with the coupon can be arbitrarily set. For example, the conditions may be a condition for identifying a user who is highly likely to use the coupon, or may be a condition for identifying a user having a high number of views, a high number of reservations, or who uses a large amount of money. For example, the first condition to the third condition described below may be set.

[First Condition]

For example, the condition may be the presence or absence of a coupon usage record. In this example, there is described a case in which the coupon usage record is stored in the action history database DB2, but the coupon usage record may be stored in another database.

For example, the user can select a coupon to be used from among the coupons displayed in the display area A21 of the search result page P2. When the user selects a coupon and reserves an accommodation facility, the user terminal 20 transmits the coupon ID of the coupon selected by the user, the user ID of the user, and the reservation details to the server 10. When the server 10 receives the coupon ID and the reservation details from the user terminal 20, the server 10 executes reservation processing of the accommodation facility, and stores the user ID and the coupon ID in the action history database DB2 in association with each other. In place of the coupon ID, a flag indicating whether or not the coupon has been used may be stored.

The determination module 107 acquires, based on the action history database DB2, a coupon usage count of each user in a determination target period, or the coupon usage count of each user in a predetermined number of the most recent reservations. The determination target period may be the entire past period or a partial period. When a partial period is to be the aggregation period, the period may be any period, for example, a period from about the last several days to about several months. The determination module 107 determines, based on the usage count of each user, whether or not the user is a target to be provided with the coupon.

For example, the determination module 107 determines that a user having a coupon usage count or coupon usage frequency equal to or more than a threshold value is a target to be provided with the coupon, and determines that a user having a coupon usage count or coupon usage frequency less than the threshold value is not a target to be provided with the coupon. The threshold value can be set to any numerical value, and may be a fixed value or a variable value. For example, 1 may be set as the threshold value, or two or more may be set as the numerical value.

[Second Condition]

For example, the degree of action may be set as a condition. The meaning of the degree of action is as described in the at least one embodiment. In Modification Example (1), as in the at least one embodiment, the degree of viewing or reserving is described as an example.

The determination module 107 acquires, based on the action history database DB2, the degree of action of each user in a determination target period. The determination module 107 determines that a user having a degree of action equal or more than a predetermined degree is a target to be provided with the coupon, and determines that a user having a degree of action less than the predetermined degree is not a target to be provided with the coupon.

For example, the determination module 107 determines that a user having a number of views, a viewing frequency, a number of reservations, or a reservation frequency equal to or more than the threshold value is a target to be provided with the coupon, and that a user having a number of views, a viewing frequency, a number of reservations, or a reservation frequency less than the threshold value is not a target to be provided with the coupon. The threshold value can be set to any numerical value, and may be a fixed value or a variable value. For example, 1 may be set as the threshold value, or two or more may be set as the numerical value.

[Third Condition]

For example, viewing or reserving a specific type of accommodation facility may be set as the condition. The specific type may be any type determined in advance. For example, the specific type may be a hotel or an inn. In Modification Example (1), there is described a case in which a hotel is the specific type.

The specific type may be set corresponding to the type of the data item. For example, when the data item is an electronic book, the specific type may be set as a novel, a comic, or a magazine. As another example, when the data item is a moving image, the specific type may be set as a type such as movie, an animation, or a sport. Similarly, when the data item is a piece of music, an application, or a file, the specific type may set as the type of the piece of music, the application, or the file.

For example, the determination module 107 determines, based on the accommodation facility database DB1 and the action history database DB2, whether or not each user has viewed or reserved a hotel. The determination module 107 acquires the accommodation facility ID stored in the action history database DB2, refers to the accommodation facility database DB1, and acquires the type of the accommodation facility ID. The determination module 107 then determines whether or not the acquired type is a hotel.

For example, the determination module 107 determines that a user who has viewed or reserved a hotel is a target to be provided with the coupon, and determines that a user who has not viewed or reserved a hotel is not a target to be provided with the coupon. As another example, the determination module 107 may determine, based on the action history database DB2, whether or not, of the accommodation facilities viewed or reserved by each user, the proportion of hotels is equal to or more than a threshold value. The threshold value may be set to any value, and may be set to, for example, a value ranging from about 0.5 to about 0.9. The determination module 107 determines that a user having a proportion equal to or more than the threshold value is a target to be provided with the coupon, and determines that a user having a proportion less than the threshold value is not a target to be provided with the coupon.

The method of determining the users to be provided with the coupon is not limited to the above-mentioned examples. For example, the determination module 107 may determine the users to be provided with the coupon based on the gender of the user. The determination module 107 may determine that males are the targets to be provided with the coupons or determine that females are the targets to be provided with the coupons. As another example, the determination module 107 may determine the users to be provided with the coupon based on the age of the user. Further, the determination module 107 may target the coupon at users of a specific age group. The specific age group may be an age group determined in advance, and may be, for example, any age group from those in their teens (10 to 19) to eighties. As another example, the determination module 107 may determine the users to be provided with the coupon based on the amount of money used by the user. The determination module 107 may target the coupon at users using money in an amount equal to or more than a threshold value in a determination target period. As yet another example, the determination module 107 may determine the users to be provided with the coupon based on a discount amount of the users who have used the coupon. The determination module 107 may determine that a user having a discount amount equal to or more than a threshold value is a target to be provided with the coupon. As still yet another example, the determination module 107 may calculate an evaluation value based on at least two of the methods described above, and determine the users to be provided with the coupon based on the evaluation value.

The providing module 106 provides the coupon to the users determined by the determination module 107. More specifically, the providing module 106 does not provide a coupon other than to the users determined by the determination module 107. For example, assuming that the accommodation facility serving as a query is $H_1$, the accommodation facility for which a coupon is to be provided is $H_2$, and the user is U, the probability of providing the coupon for the accommodation facility $H_2$ can be expressed by the expression in the following paragraph. The expression in the following paragraph expresses the probability that the sum of the number of views and the number of reservations for the accommodation facility $H_1$ and for the accommodation facility $H_2$ are both in the top 10%.

$$P(H_2|U)=P(H_2|H_1)*P(H_1|U)*P(U)$$

$P(H_2|U)$ on the left side of the expression is the probability that the coupon of the accommodation facility $H_2$ is to be provided to the user U. $P(H_2|H_1)$ on the right side of the expression is the score acquired by the first information acquisition module 102, and is a score based on collaborative filtering. $P(H_1|U)$ on the right side is a numerical value representing whether or not the user has viewed or reserved the accommodation facility $H_1$. For example, this numerical value is 1 when the user has viewed or reserved the accommodation facility $H_1$, and is 0 when the user has not viewed or reserved the accommodation facility $H_1$. $P(U)$ on the right side is a numerical value representing whether or not the user is a coupon target, and is 1 when the user is a coupon target and 0 when the user is not a coupon target.

When the sum of the number of views and the number of reservations of any one of the accommodation facilities $H_1$ and $H_2$ is not in the top 10%, the probability of providing the coupon of the accommodation facility $H_2$ can be expressed by the expression in the following paragraph. As expressed in the following expression, any one of the accommodation facilities $H_1$ and $H_2$ is not viewed or reserved very frequently, and hence in place of using a score $P(H_2|H_1)$ based on collaborative filtering, a score $F(H_1, H_2)$ output by the output module 103 is used. The details of $F(H_1, H_2)$ are as described in the at least one embodiment.

$$P(H_2|U)=F(H_1,H_2)*P(H_1|U)*P(U)$$

In Modification Example (1), through providing the coupon to users determined based on the action history of each user, the coupon can be prevented from being provided to users who do not require the coupon. As a result of not providing the coupon to users who do not require the coupon and reducing execution of processing for coupon distribution, the processing load on the server 10 can be reduced.

(2) For example, through grouping users and setting the parameter of the output module 103 for each user group, it is possible to more strongly reflect a user preference in the parameter to improve the score accuracy.

In the information processing system 1 of Modification Example (2), the grouping module 108 is implemented. The grouping module 108 is mainly implemented by the CPU 11. The grouping module 108 is configured to group each user based on a method determined in advance. The grouping module 108 groups users having a specific attribute. The grouping module 108 records the user ID of each user and the user group to which the user belongs in the data storage unit 100 in association with each other.

For example, the grouping module 108 may perform grouping in the same manner as the first method to the third method described in Modification Example (1). As another example, the grouping module 108 may perform grouping based on the gender of the user. The grouping module 108 may group the users into male users and female users. As yet another example, the grouping module 108 may perform grouping based on the age of the user. The grouping module 108 may group the users into age groups. As still yet another example, the grouping module 108 may group the users based on the amount of money used by the user. The grouping module 108 may group the users into bands of the amount of money used by the users in a determination target period. As still yet another example, the grouping module 108 may perform grouping based on a discount amount of the users who have used the coupon. The grouping module 108 may group the users into bands based on discount amount. For example, the grouping module 108 may also calculate an evaluation value based on at least two of the methods described above, and perform grouping based on the calculated evaluation value.

In Modification Example (2), a parameter is provided for each user group. For example, in the data storage unit 100, a user group and a parameter are stored in association with each other. A parameter is not required to be provided for all the user groups, and a parameter may be provided for only a part of the user groups.

The setting module 104 sets the parameter for each user group. The setting module 104 sets the parameter associated with the user group based on the score acquired based on the action history of the users belonging to the user group. The setting module 104 generates teacher data for setting the parameter associated with the user group based on the action history of the users belonging to that user group. The method of setting the parameter based on teacher data is as described in the at least one embodiment.

In Modification Example (2), through setting the parameter of the output module 103 for each user group, it is possible to effectively increase the accuracy of identifying an accommodation facility having high relevance.

(3) For example, updating of the parameter may be executed based on an instruction from the system administrator or may be executed regularly. The parameter update timing may be a date and time determined in advance, or may arrive regularly or irregularly. The parameter update timing may be stored in the data storage unit 100 in a batch file or the like.

When the update timing arrives regularly, the length of the period between updates may be arbitrary, for example, about 1 hour to several days, or about one week to several months. When the update timing arrives irregularly, the update timing may be a date and time specified by the system administrator, or may be a randomly determined date and time. As another example, the update timing may arrive every time the sum value of the number of views or the number of reservations of the accommodation facility exceeds a fixed value.

In the information processing system 1 of Modification Example (3), the update module 109 is implemented. The update module 109 is mainly implemented by the CPU 11. The update module 109 is configured to update the action history of each user. The update module 109 updates the action history database DB2 when each user views or reserves an accommodation facility. The method of updating the action history database DB2 is as described in the at least one embodiment.

The setting module 104 updates the parameter based on the action history of each user updated by the update module 109. For example, the setting module 104 acquires the current date and time by using a real time clock or the like, and determines whether or not the update timing has arrived by determining whether the current date and time has reached a predetermined date and time. As another example, the setting module 104 determines whether or not the update timing has arrived by referring to the action history database DB2, and determining whether or not the sum value of the number of views or the number of reservations of the accommodation facility exceeds a fixed value. When it is determined that the update timing has arrived, the setting module 104 updates the parameter based on the latest action history database DB2. The method of determining the parameter is as described in the at least one embodiment.

In Modification Example (3), it is possible to acquire a highly accurate score corresponding to the latest trend by repeatedly updating the parameter. More specifically, user preferences may change over time, and when time has elapsed since the parameter of the output module 103 is set, the preference may fail to match the latest preference of the user. In this regard, through updating the parameter as required based on the latest action history database DB2, the latest user preference can be reflected in the parameter.

(4) For example, two or more of the above-mentioned modification examples may be combined.

For example, in the at least one embodiment, there is described a case in which the providing module 106 provides a coupon for an accommodation facility, but the providing module 106 may provide a coupon for a package tour, a highway bus, a rental car, an airline ticket, an eating and drinking establishment, and the like. Further, in the at least one embodiment, there is described a case in which the providing module 106 provides a coupon, but the information provided by the providing module 106 is not limited to a coupon. The providing module 106 may provide any information on the accommodation facility, for example, a link to the accommodation facility page P3 or information such as a name or an image of the accommodation facility as a recommendation or an advertisement.

In the at least one embodiment, there is described a case in which the information processing system 1 is applied to a travel reservation service, but the information processing system 1 is applicable to various other situations. For example, the information processing system 1 may be applied to electronic commerce, or may be applied to content or file distribution. When the information processing system 1 is applied to electronic commerce, information on a product corresponds to a data item, and a coupon or the like of the product is provided. When the information processing system 1 is applied to content or file distribution, content such as an electronic book, a moving image, a piece of music, or an application, or a file such as a document file, a text file, an image file, or an audio file, corresponds to the data item, and a coupon for such files is provided.

For example, among the functions of the information processing system 1, the functions other than those of the identification module 101, the first information acquisition module 102, the output module 103, and the setting module 104 may be omitted. For example, the data storage unit 100 is not required to be included in the information processing system 1, and may be implemented by a database server. Further, the functions described as being implemented by the server 10 may be shared between the server 10 and the user terminal 20.

The invention claimed is:

1. An information processing system, comprising at least one processor configured to:
   identify, based on an action history of each of a plurality of users, a plurality of first contents having a degree of action equal to or more than a predetermined degree;
   acquire, based on the action history of each of the plurality of users, first information indicating relevance between the plurality of first contents using collaborative filtering;
   update, based on the first information, a parameter using first features of each of the plurality of first contents; and
   output, based on the updated parameter, second information indicating relevance between a plurality of second contents using content-based filtering, wherein at least one second content in each combination of second contents in the plurality of second contents has a degree of action less than the predetermined degree;
   identify, in response to receiving a query, a first content in the plurality of first contents for which the second information has been outputted; and
   provide information on another content related to the identified first content based on the first information or the second information.

2. The information processing system according to claim 1, wherein the at least one processor is configured to:
   provide the information on another content based on the first information, when the identified first content has a degree of action equal to or more than the predetermined degree; and
   provide the information on another content based on the second information, when the identified first content has a degree of action less than the predetermined degree.

3. The information processing system according to claim 1, wherein the at least one processor is configured to provide each user in the plurality of users who has performed an action on the identified first content with the information on another first content.

4. The information processing system according to claim 1, wherein the at least one processor is configured to determine, based on the action history of each user in the plurality of users, a user to which the information on another content is to be provided, wherein the at least one processor is configured to provide the information on another content to the user.

5. The information processing system according to claim 1, wherein the at least one processor is configured to group users in the plurality of users based on a method determined in advance, wherein the parameter is provided for each user group, and wherein the at least one processor is configured to update the parameter for each user group.

6. The information processing system according to claim 1, wherein the at least one processor is configured to update the action history of each user in the plurality of users, wherein the at least one processor is configured to update the parameter based on the action history of each user in the plurality of users.

7. An information processing method, comprising:
   identifying, based on an action history of each of a plurality of users, a plurality of first contents having a degree of action equal to or more than a predetermined degree;
   acquiring, based on the action history of each of the plurality of users, first information indicating relevance between the plurality of first contents using collaborative filtering;
   updating, based on the first information, a parameter using first features of each of the plurality of first contents; and
   outputting, based on the updated parameter, second information indicating relevance between a plurality of second contents using content-based filtering, wherein at least one second content in each combination of second contents in the plurality of second contents has a degree of action less than the predetermined degree;
   identifying, in response to receiving a query, a first content in the plurality of first contents for which the second information has been outputted; and
   providing information on another content related to the identified first content based on the first information or the second information.

8. A non-transitory computer-readable information storage medium for storing a program for causing a computer to:
   identify, based on an action history of each of a plurality of users, a plurality of first contents having a degree of action equal to or more than a predetermined degree;
   acquire, based on the action history of each of the plurality of users, first information indicating relevance between the plurality of first contents using collaborative filtering;
   update, based on the first information, a parameter using first features of each of the plurality of first contents; and
   output, based on the updated parameter, second information indicating relevance between a plurality of second contents using content-based filtering, wherein at least one second content in each combination of second contents in the plurality of second contents has a degree of action less than the predetermined degree;
   identify, in response to receiving a query, a first content in the plurality of first contents for which the second information has been outputted; and
   provide information on another content related to the identified first content based on the first information or the second information.

* * * * *